United States Patent
Hsieh

(10) Patent No.: US 8,409,678 B2
(45) Date of Patent: Apr. 2, 2013

(54) THIN METAL CASING WITH PLASTIC PART AND MANUFACTURING METHOD THEREOF

(75) Inventor: Ming-Jen Hsieh, Taiping (TW)

(73) Assignee: Pao Yi Technology Co., Ltd., Taiping, Taichung County (TW)

( * ) Notice: Subject to any disclaimer, the term of this patent is extended or adjusted under 35 U.S.C. 154(b) by 0 days.

(21) Appl. No.: 13/639,497

(22) PCT Filed: Apr. 6, 2010

(86) PCT No.: PCT/CN2010/000437
§ 371 (c)(1),
(2), (4) Date: Oct. 4, 2012

(87) PCT Pub. No.: WO2011/123968
PCT Pub. Date: Oct. 13, 2011

(65) Prior Publication Data
US 2013/0029071 A1    Jan. 31, 2013

(51) Int. Cl.
*B29D 22/00* (2006.01)
*B29D 23/00* (2006.01)
*B32B 1/08* (2006.01)
*B32B 15/08* (2006.01)

(52) U.S. Cl. .............. 428/35.9; 420/35.7; 420/35.8; 420/36.8; 264/135; 264/259; 264/265; 264/273; 264/131; 264/137

(58) Field of Classification Search ........... 428/35.7, 428/35.8, 35.9, 36.8; 264/135, 259, 265, 264/273, 131, 137
See application file for complete search history.

(56) References Cited

U.S. PATENT DOCUMENTS

| | | | |
|---|---|---|---|
| 3,654,062 | A | 4/1972 | Loew |
| 4,391,954 | A | 7/1983 | Scott |
| 5,472,782 | A | 12/1995 | Naritomi |
| 5,695,699 | A | 12/1997 | Naritomi |
| 6,117,384 | A | 9/2000 | Laurin et al. |
| 6,136,441 | A | 10/2000 | MacGregor et al. |
| 6,465,102 | B1 | 10/2002 | Honigfort et al. |
| 2007/0218721 | A1 | 9/2007 | Naritomi |
| 2008/0127479 | A1 | 6/2008 | Naritomi et al. |
| 2009/0117401 | A1 | 5/2009 | Naritomi et al. |

FOREIGN PATENT DOCUMENTS

| | | |
|---|---|---|
| CN | 1711170 A | 12/2005 |
| CN | 101422947 A | 5/2009 |
| CN | 101516598 A | 8/2009 |
| CN | 101547778 A | 9/2009 |
| CN | 1717323 B | 6/2010 |
| CN | 101341023 B | 5/2012 |
| JP | 5-269787 | 10/1993 |

(Continued)

*Primary Examiner* — Michael C Miggins
(74) *Attorney, Agent, or Firm* — Muncy, Geissler, Olds & Lowe, PLLC

(57) ABSTRACT

A thin metal casing with plastic parts and a manufacturing method thereof are revealed. A thin metal casing already formed having on one surface processed and coated with a decorative outer layer is provided. A thermoplastic rubber (TPR) adhesive layer is disposed on an unprocessed surface of the thin metal casing. The TPR adhesive layer is synthesized by butadiene-styrene block copolymer and hydrocarbon petroleum resin. Then the thin metal casing with the TPR adhesive layer is set and fixed in a cavity of an injection molding mold. Next plastic parts are formed on the TPR adhesive layer of the thin metal casing by plastic injection molding. The plastic parts are melted and connected to the TPR adhesive layer integrally by pressure and temperature of injection material. Simultaneously a part of the TPR adhesive layer is infiltrated into existing micro concave holes on surface of the thin metal casing.

9 Claims, 7 Drawing Sheets

FOREIGN PATENT DOCUMENTS

| | | |
|---|---|---|
| TW | 404888 B | 9/2000 |
| TW | 434145 B | 5/2001 |
| TW | M261368 | 4/2005 |
| TW | I280190 | 5/2007 |
| TW | M328384 | 3/2008 |
| TW | M345706 | 12/2008 |
| WO | WO 03/064150 A1 | 8/2003 |
| WO | WO 2005/061203 A2 | 7/2005 |

THIN METAL CASING WITH PLASTIC PART AND MANUFACTURING METHOD THEREOF

BACKGROUND OF THE INVENTION

1. Fields of the Invention

The present invention relates to a thin metal casing with plastic parts and a manufacturing method thereof, especially to a thin metal casing attached with a thermoplastic rubber (TPR) adhesive layer on a surface thereof and then the TPR adhesive layer is connected with plastic parts by injection molding. The TPR adhesive layer is a thermoplastic rubber layer synthesized by butadiene-styrene block copolymer and hydrocarbon petroleum resin. The plastic parts, the TPR adhesive layer and the thin metal casing are integrated firmly to form an integral composite structure by pressure and temperature of injected material during injection molding.

2. Descriptions of Related Art

There are various products available on the market, especially electronics including, but not limited to, computers such as notebook computers, communication products such as mobile phones, consumer products (so-called 3C products), etc. They all include a thin casing used as a housing that covers all the components therein. The structure of the thin casing varies according to the design requirements of the product. According to materials for a base of the thin casing, the thin casing includes two types—a thin plastic casing and a metal thin casing.

The thin plastic casing with a decorative outer surface is generally produced by in-mold decoration process (IMD). A substrate that is 3-dimensional and printed with figures such as a plastic film is mounted into a mold. The substrate (plastic film) is called IMD film hereafter. Then thermoplastic resin is injected by plastic injection molding technique to form a base of the casing on the rear side of the IMD film and the base is called resin base. The resin base and the IMD film are connected to form an integral thin plastic casing. The IMD film is fixed and connected to the outer surface of the resin base to form a permanent device. The IMD film is used as a decorative outer surface for the thin plastic casing, a protective surface for the thin plastic casing or both. Moreover, the protective surface for the can also be temporarily fixed on the outer surface of the resin base to form a temporary device. After completing the production, the IMD film is peeled off. The printed figures on the IMD film are transferred to or embossed on the outer surface of the resin base to form a decorative outer surface of the thin plastic casing.

There are many techniques related to the structure design and manufacturing method of the thin plastic casing mentioned above.

Refer to U.S. Pat. No. 3,654,062, a molded decorative plaque including a body portion of a plastic material and a facing sheet disposed over the front face of the body portion is produced by injection molding. The thermoplastic is injected into a mold on a rear side of the facing sheet. As to U.S. Pat. No. 6,117,384, a printed substrate with at least one color is fit into a mold and then a molten resin is injected into the mold cavity through gates behind the printed substrate to produce a one-piece permanently bonded three-dimensional product. In the U.S. Pat. No. 4,391,954, a thermoplastic molding composition comprising an aromatic carbonate polymer and a polyester derived from a cycleohexanedimethanol is revealed. The U.S. Pat. No. 6,465,102 reveals an article that includes a formed polymeric base with a decorative surface area and a process for making the molded structure. The polymeric base comprises a transparent cycloaliphatic polyester resin that is free from an aromatic moiety and the method of molding thereof. In the U.S. Pat. No. 6,117,384, an improved in-mold decorating process (IMD) for the manufacture of plastic articles is disclosed while the U.S. Pat. No. 6,136,441 reveals techniques related to multilayer plastic articles. Refer to the patents that reveal structure design or manufacturing method related to the plastic housing mentioned above, it is learned that most of the techniques place a further limitation on the IMD film and the resin base respectively. For example, the IMD film or the resin base is restricted to be made from plastic with a specific chemical group. Thus an integral composite plastic board in which the film and the base are connected firmly and difficult to peel off is produced. Each patent is distinctive from other patents.

However, when the IMD film and/or the resin base of the thin plastic casing formed by composite materials are/is placed with a further limitation, not only the materials used are restricted, the applications of the IMD film and/or the resin base are also limited. This has negative effect on the applications of the produced thin plastic casing. For example, once users want to use different materials to produce the IMD film such as fabric, leather, resin fiber, etc for diversity of products, the same technique or equipment is unable to be used for manufacturing the products with high production efficiency, ease in mass production, and good quality control. Thus the use efficiency and applications of the plastic housing are unable to be improved. These are disadvantages of the plastic housing.

As to the common thin metal casing, it is generally produced by machining of a metal sheet such as aluminum alloy sheet. The thin metal casing can be further treated by surface processing to have gloss or patterns. Moreover, a protective resin layer such as resin film is arranged over the outer surface of the metal housing to avoid damages in use such as scratches, bumps, etc. Or a resin layer with figures is arranged at the outer surface of the metal housing for protecting and improving the appearance or texture of the product. For assembling components inside the product, plastic injection molding technique or injection molding attachment is used to dispose or attach various plastic components such as flange or rib on a certain position of an inner surface (metallic surface) of the thin metal casing. Thus the structure of these plastic components is simplified, the whole thickness is reduced and the structural strength is improved.

There are various techniques related to the structure design and manufacturing method of the thin metal casing mentioned above available now, including U.S. Pat. No. 5,695,699, U.S. Pat. No. 5,472,782, US App. Pub. No. US2009/0117401, US2008/0127479, US2007/0218721, etc.

Refer to Chinese Pat. App. No. ZL02805359.1 (PCT/JP2002/007267, WO2003/064150), a composite material of aluminum alloy and resin and a production method therefore are revealed. As a pre-treatment, a rib is immersed in at least one aqueous solution selected from ammonia, hydrazine, hydrazine derivative and water-soluble amine compound. Then the rib is inserted into an injection molding die used to inject it. A thermoplastic resin composition is filled in the surface of a metal frame by injection molding to form a rib. A molded cover enclosure includes integrally joined metal frame and ribs of a thermoplastic resin composition and having the features of metal in terms of strength and external design. Moreover, the interior of the enclosure can be produced with complicated shape and structure.

Refer to Chinese Pat. App. No. ZL200380102886.0 (PCT/JP2003/014213, WO2004/041532), a composite article of aluminum alloy with resin and a method for production thereof are revealed. The composite article includes a thermoplastic resin composition containing polyphenylene sulfide as a component and adhered to the surface of a shaped article of an aluminum alloy. The method includes a pretreatment comprising immersing the shaped article of an aluminum alloy in an aqueous solution of at least one selected from among ammonia, hydrazine and a water-soluble amine compound.

Refer to Chinese Pat. App. No. ZL200380104500.X (PCT/JP2003/014214, WO2004/041533), a composite of aluminum alloy and resin composition and a process for producing the same are revealed. The composite is characterized by comprising an aluminum alloy shaped item having a surface roughness of 5 to 50 μm or more, the surface provided with 1 μm or less fine depressions or protrusions, and a thermoplastic resin composition composed mainly of a polyphenylene sulfide or polybutylene terephthalate resin whose average of lengthwise and crosswise linear expansion coefficients is in the range of 2 to $4 \times 10^{-5}$ °C.$^{-1}$. The thermoplastic resin composition is penetrating and anchored in the depressions or protrusions.

Refer to Chinese Pat. App. No. ZL200680046075.7 (PCT/JP2006/324493, WO2007/066742), an aluminum alloy-resin composite and a method of producing the same are revealed. The composite is formed by an aluminum alloy-based material and resin component. An aluminum alloy-based material is dipped in a corrosive aqueous solution such as ammonia, hydrazine, or water-soluble amine compounds to form microconcaves coating the surface. The average radius of the microconcaves is ranging from 10 nm to 80 nm. As the resin component, it includes polyamide resin compounded and a material having improved shock resistance. The aluminum alloy-based material is inserted into an injection molding die and the polyamide-based resin composition is injected onto the surface thereof to give an integrated composite product.

However, the above patents all relate to a composite material formed by metal and resin and a manufacturing method thereof and feature on that the metal (such as aluminum alloy) is immersed in a special aqueous solution (such as water-soluble amine). Then thermoplastic resin with specific ingredients is attached and integrated to a surface of the aluminum alloy by injection molding. In other words, the treatment of the metal (aluminum alloy) and the ingredients of the resin are both specified and restricted. Thus the manufacturing method and the application of the composite material are limited. This has negative effect on use efficiency and application of the metal housing. Especially most of the specific aqueous solution used doesn't match environmental requirements. The thin metal casings and manufacturing methods thereof mentioned above have following shortcomings: In the injection mold, a pouring opening is designed corresponding to each plastic part for performing injection under high pressure at fixed points. During the plastic injection molding process, the thin metal casing is easy to get deformed or damaged and the difficulty in manufacturing of the injection mold is increased. Moreover, the metal surface of the thin metal casing needs to be soaked in specific aqueous solution and this makes the manufacturing process more complicated and has negative effect on mass production of the thin metal casing. The specific aqueous solution also causes environmental problems.

As to Taiwanese Pat. App. No. 85100575 (Pub. No 404888), a metal sheet covered by resin and having high distinctness of image and excellent adhesion during processing is revealed. A metal sheet is used as a substrate and is covered by resin. At one side of the substrate, a coating layer, a modified acrylic resin layer with a thickness of 5~100 μm, a patterned and/or printed layer, an adhesive layer, and a polyester-based resin film with a thickness of 5~100 μm arranged in sequence therefrom (refer to claim 1). The modified acrylic resin layer is formed by polypropylene copolymer 100~20 parts by weight and polypropylene 100~0 parts by weight. Or the substrate is disposed with a coating layer, a patterned and/or printed layer, a modified acrylic resin layer with a thickness of 5~100 μm, an adhesive layer, and a polyester-based resin film with a thickness of 5~100 μm in turn (refer to claim 2). Or the substrate is installed with a coating layer, a modified acrylic resin layer with a thickness of 5~100 μm, an adhesive layer, and a polyester-based resin film with a thickness of 5~100 μm in turn (refer to claim 3). Or the substrate is set with a coating layer, a modified alkene layer with a thickness of 5~100 μm, and a transparent polyester-based resin film with a thickness of 5~100 μm in sequence (refer to claim 4). However, the ingredients of the laminated resin layer have been specified and limited and the main purpose is to make the metal sheet covered by the resin have high distinctness of image. Thus the shape of the metal sheet is also limited and this has negative effect on the application of the metal housing produced by the metal sheet.

Refer to Taiwanese Pat. App. No. 86106332 (Pub. No. 434145) "metal sheet coated with resin and having higher definition, reflectivity and good adhesion", a metal sheet covered with resin is revealed. The metal sheet covered with resin includes a metal sheet used as a base, a transparent soft resin layer, an adhesive layer with pigments, a transparent resin film having two sides with gloss finish. The arithmetic mean deviation Ra of the roughness of the metal sheet is between 0 and 10 micrometers. The transparent soft resin layer can be uncured mixed type resin layer, coating cover layer made from polyester resin, or polyolefin resin. At least one surface of the metal sheet is covered by a coloring layer, the soft resin layer, the adhesive layer and the transparent layer in turn from the metal sheet to the transparent resin film. However, the ingredients of the resin coated the metal sheet are limited and the main purpose is to make the metal sheet covered by the resin have high reflectivity. Thus the shape of the metal sheet is also limited and this has negative effect on the application of the metal housing produced by the metal sheet.

Refer to Taiwanese Pat. App. No. 093119015 (Pat. Grant No. I280190) "method for forming electronic metal housing and structure of the same", an aluminum alloy substrate disposed with a film layer focused on improvement of shortcomings of two prior arts is revealed. The method includes a step of coating adhesive, a step of firing and heating, a step of rolling and pressing and a step of cooling and forming. Firstly, coat adhesive on a surface of at least one side of a metal substrate made from aluminum alloy and the adhesive has metal powders. Then heat the metal substrate coated with the adhesive to make the adhesive become soft. A film layer is rolled and pressed over the adhesive by a heated roller. The film layer consists of at least one polyvinylchloride (PVC) layer, an adhesive layer, and a polyester layer laminated to each other in turn. The adhesive layer also includes metal powders. After cooling, the film layer and the metal substrate are connected to each other tightly. However, the ingredients of the film layer laminated on the surface of one side of the aluminum metal substrate including the PVC layer, the adhesive layer, and the polyester layer arranged in turn are specified and limited. Thus the shape of the metal substrate is restricted and this has negative effect on the application of the thin metal casing.

Refer to Taiwanese Pat. App. No. 093210282 (Pat. Grant No. M261368) "metal plate of electronic housing", it also has shortcomings of restrictions on the film layer as mentioned in the above Taiwanese Pat. App. No. 093119015 (Pat. Grant No. I280190).

Refer to Taiwanese Pat. App. No. 097208521 (Pat. Grant No. M345706) "composite metal sheet", a composite metal sheet including a metal substrate, a composite resin adhesive layer and a pressed layer laminated on a metal sheet over the composite resin adhesive layer. Thus the metal sheet and the metal substrate are connected with each other tightly. However, the two outer sides of this invention include the metal sheet and the metal substrate, both are being specified and restricted.

Refer to Taiwanese Pat. App. No. 096215339 (Pat. Grant No. M328384) "metal with environmental protection laminate", the metal with the environmental protection laminate includes at least one metal substrate, an adhesive layer coated on at least one surface of one side of the substrate, and a film layer formed by a polyurethane (PU) bottom layer and a PU surface layer. The adhesive layer can be softened by being heated. A roller is used to roll and press the film layer on the adhesive layer. Then after cooling, the film layer and the metal substrate are connected firmly. However, the film layer formed by the PU bottom layer and the PU surface layer has been specified and defined. Thus the appearance or texture of the metal substrate is restricted and this is bad for the application of the metal housing produced by the metal with the film.

Thus the techniques available for composite boards have certain shortcomings. There is room for improvement and a need to provide a novel structure of the composite board and a method for manufacturing the same that overcomes the shortcomings of the prior arts ZL02805359.1, ZL200380102886.0, ZL200380104500.X and ZL200680046075.7, etc.

SUMMARY OF THE INVENTION

Therefore it is a primary object of the present invention to provide a thin metal casing with plastic parts and a manufacturing method thereof. A TPR adhesive layer with a thickness of 400-500 µm is disposed on a whole metal surface of a thin metal casing or a local part of the metal surface of the thin metal casing for being connected to plastic parts. There is no restriction on the disposition way of the TPR adhesive layer. The TPR adhesive layer is coated by printing or spray coating. The TPR adhesive layer is a thermoplastic rubber layer synthesized by butadiene-styrene block copolymer and hydrocarbon petroleum resin. Then the thin metal casing with the TPR adhesive layer is mounted and fixed into a cavity of an injection mold whose shape is corresponding to the shape of the thin metal casing. Next plastic parts are formed on the TPR adhesive layer on surface of the thin metal casing by plastic injection molding. The plastic parts and the TPR adhesive layer are melted and integrated with each other. At the same time, a part (about 10%) of the TPR adhesive layer with a thickness of about 40-50 µm is infiltrated into micro concave holes already existing on the metal surface of the thin metal casing. Thus the plastic parts are fixed stably on the metal surface of the thin metal casing to form an integral composite structure. The manufacturing processes for arranging plastic parts on the thin metal casing and the production of a mold are simplified efficiently. Moreover, the shortcomings of prior arts in the manufacturing processes and the mold can be avoided. The shortcomings of prior arts include easy deformation of the thin metal casing in a cavity of the mold caused by performing injection under high pressure at fixed points for molding the plastic parts, complicated manufacturing processes and the environmental problems due to soaking process of the metal surface in specific aqueous solution and restrictions on materials for the plastic parts, etc.

It is another object of the present invention to provide a thin metal casing with plastic parts and a manufacturing method thereof in which the plastic parts are formed by plastic injection molding and injection materials are injected under common injection pressure and temperature. This not only favors the production of injection molds but also simplifies arrangement and design of channels for conveying injection materials. Moreover, the other surface of the thin metal casing is covered by a decorative outer layer such as an electroplated layer, an anodized layer, a painted lay, a film layer, etc. The decorative outer layer is not easy to get deformed or damaged due to pressure during the injection molding processes. Thus the prevent invention achieves high production efficiency, easy mass production, low manufacturing cost and easy control of molding quality.

In order to achieve the above objects, a thin metal casing with plastic parts according to the present invention includes a thin metal casing, a TPR adhesive layer and at least one plastic part. The thin metal casing is formed by a metal substrate with a certain thickness being processed. A plurality of micro concave holes is naturally formed on inner and outer surfaces of the metal substrate during manufacturing of the metal substrate and is distributed evenly thereon. The TPR adhesive layer is a thermoplastic rubber layer synthesized by butadiene-styrene block copolymer and hydrocarbon petroleum resin, having a thickness of 400-500 µm and arranged at a metallic inner surface of the thin metal casing. The plastic parts are formed by plastic injection molding. The thin metal casing with the TPR adhesive layer is set and fixed in a cavity of an injection mold and injection material is injected to the inner surface of the thin metal casing to form the plastic parts. By the injection pressure and temperature of the injection material, the plastic parts and the TPR adhesive layer are melted and integrated with each other. At the same time, a part of the TPR adhesive layer is infiltrated into the micro concave holes on metallic surface of the thin metal casing. Thus the injected plastic parts and the thin metal casing are connected to form an integral composite structure.

A manufacturing method of a thin metal casing with plastic parts used for manufacturing of a thin metal casing connected with plastic parts includes following steps. Provide a thin metal casing formed by a metal substrate with a certain thickness being processed. The inner and outer surfaces of the metal substrate are disposed with a plurality of evenly-distributed micro concave holes. Then arrange a TPR adhesive layer with a thickness of 400-500 µm on the metallic inner surface of the thin metal casing. The TPR adhesive layer is a thermoplastic rubber layer synthesized by butadiene-styrene block copolymer and hydrocarbon petroleum resin. Next fix the thin metal casing with the TPR adhesive layer in a cavity of an injection mold and inject injection material at the TPR adhesive layer on the inner surface of the thin metal casing to form at least one plastic part by plastic injection molding. The plastic part and the TPR adhesive layer are connected and integrated by pressure and temperature of the injection material during injection molding process. At the same time, a part of the TPR adhesive layer is infiltrated into micro concave holes on metallic surface of the thin metal casing. Thus the plastic part and the thin metal casing are connected to form an integral composite structure. After cooling, the injection mold is removed to get a thin metal casing with at least one plastic part.

The structure of the plastic part is simplified and the structure strength is improved by the present invention. Moreover, the present invention avoids the shortcomings of prior arts and achieves the above objects.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
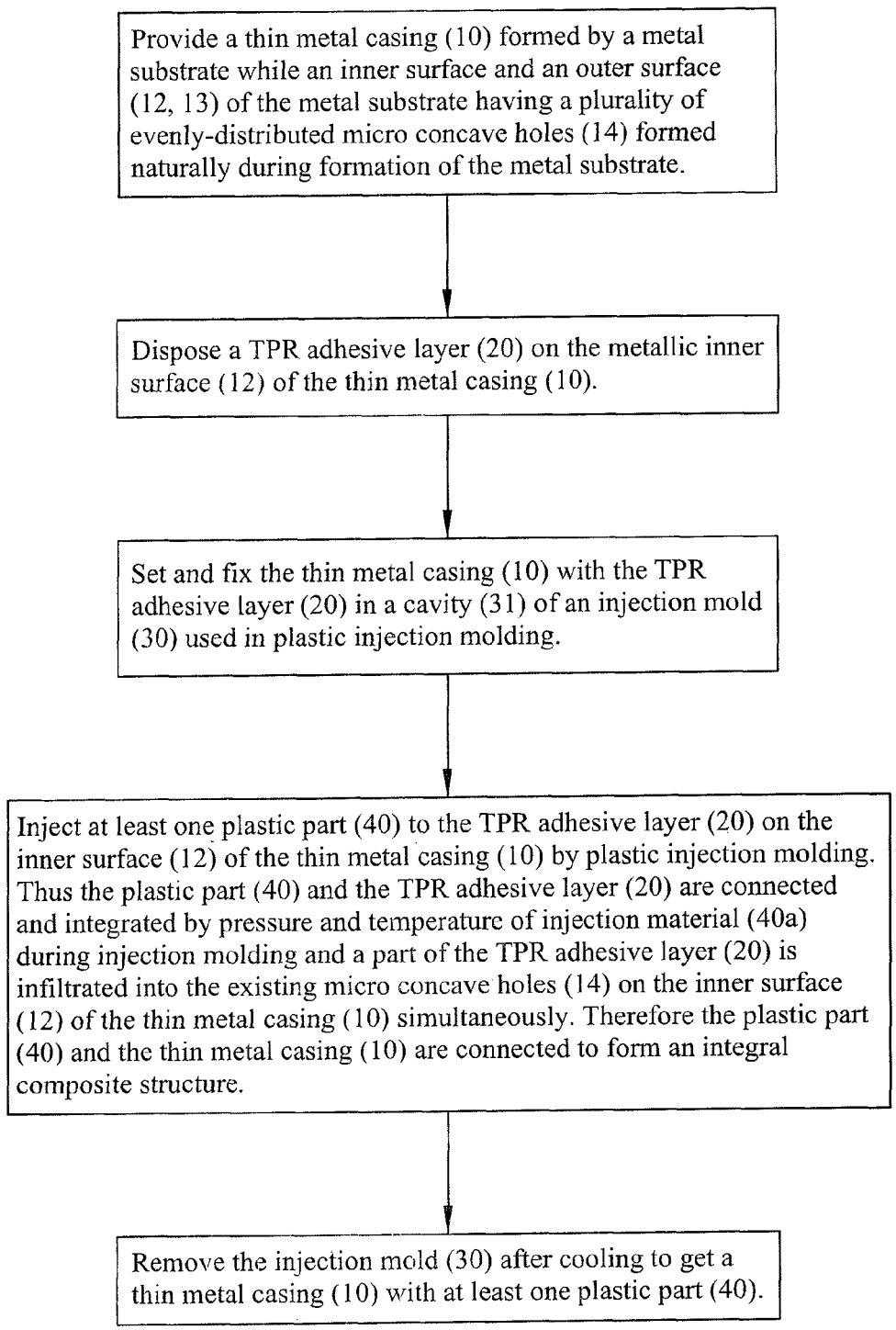
FIG. 1 is a flow chart showing steps of a method for manufacturing a thin metal casing with plastic parts according to the present invention.
Figure 2:
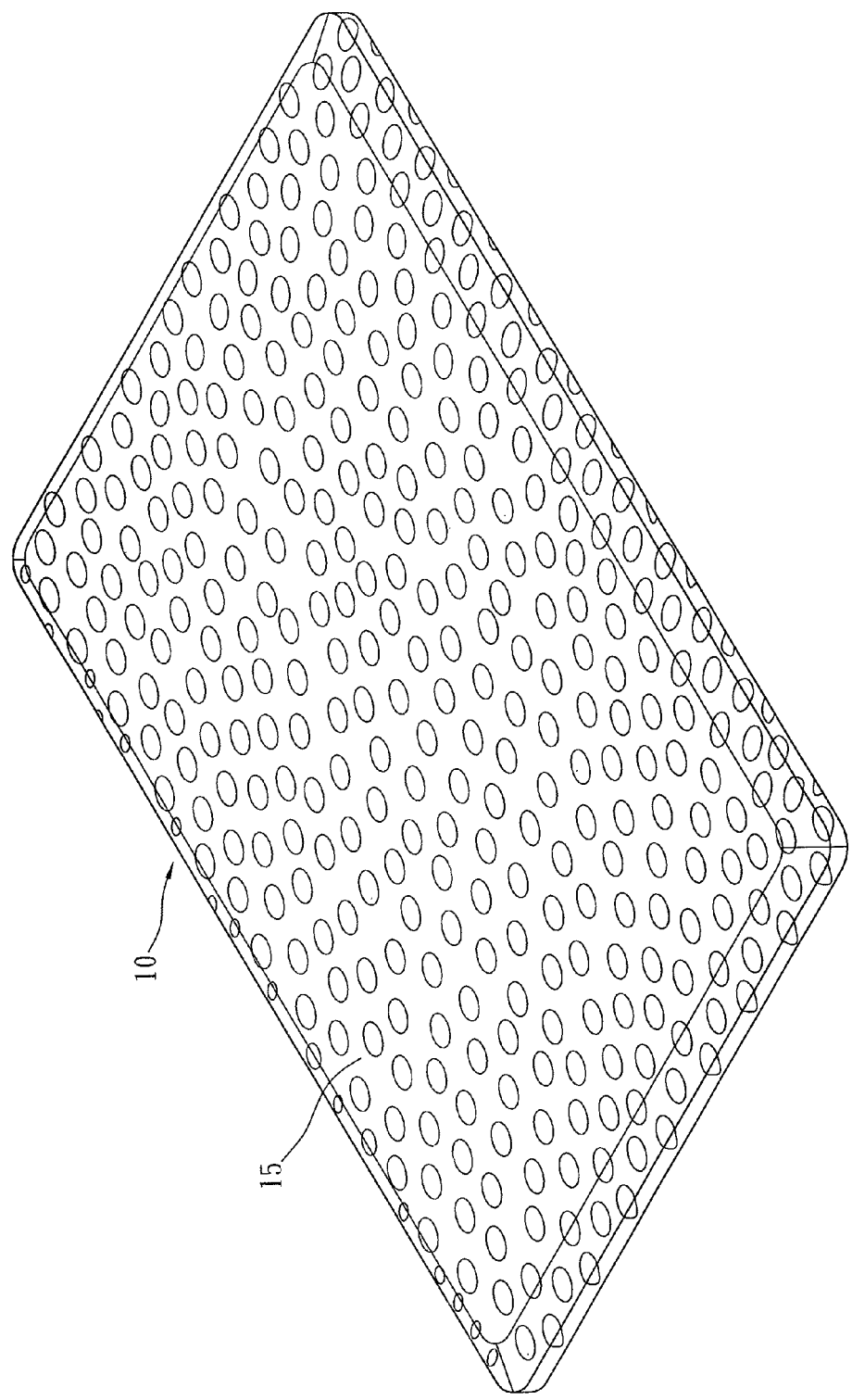
FIG. 2 is a perspective front view of an embodiment of a thin metal casing according to the present invention.
Figure 3:
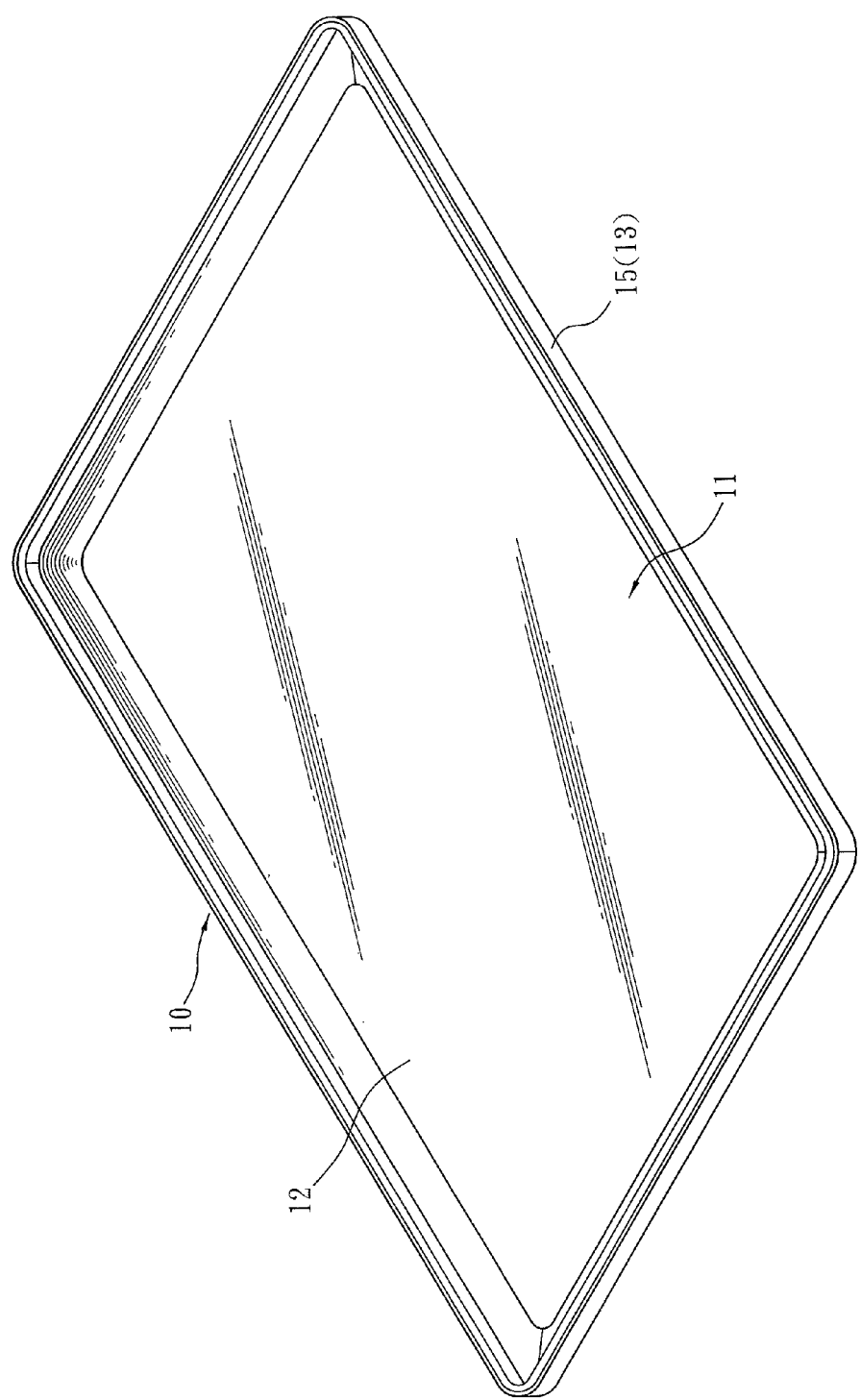
FIG. 3 is a schematic drawing showing a rear view of the embodiment in FIG. 2.
Figure 4:
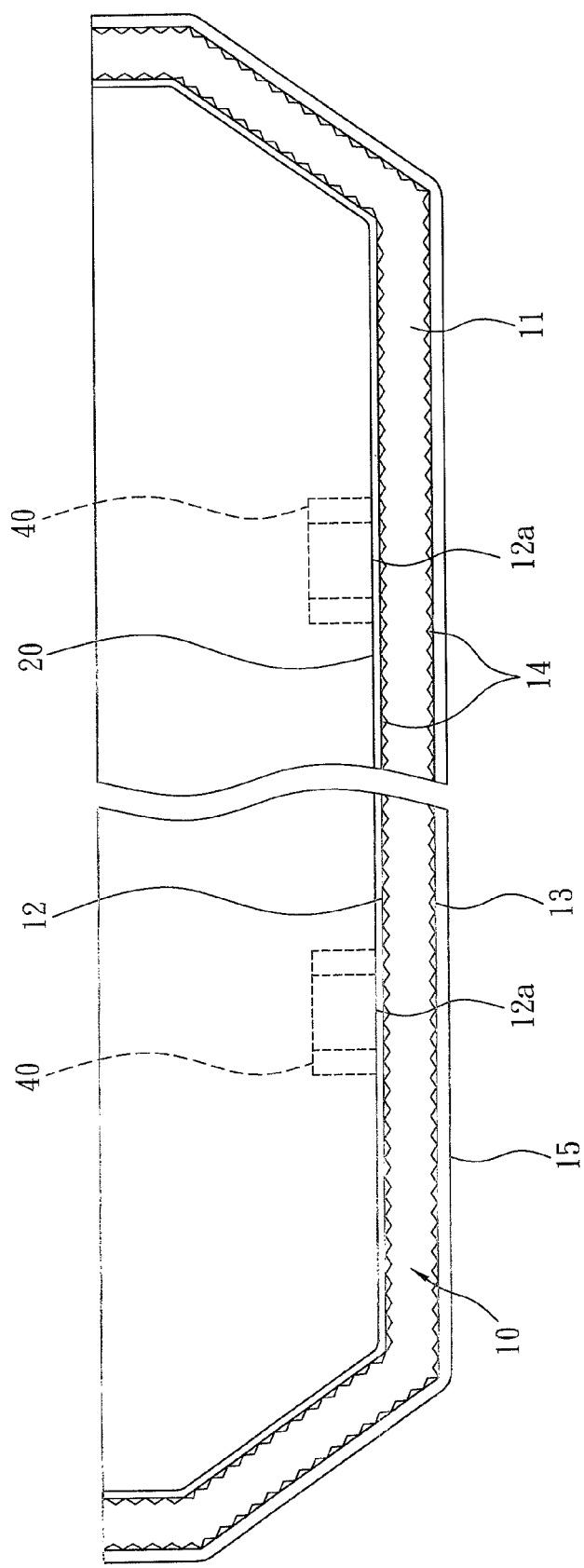
FIG. 4 is a partial enlarged view of a cross section of the embodiment in FIG. 2.

Refer to FIG. 1, a manufacturing method of a thin metal casing 1 with plastic parts of the present invention includes following steps:

First provide a thin metal casing 10. The thin metal casing 10 of the present invention is, but not limited to a housing of computer products including computers such as notebook computers, communication products or consumer products (3C products) etc. Refer to FIG. 2, FIG. 3 and FIG. 4, take a housing of a notebook computer as an example. The thin metal casing 10 includes but not limited to a metal substrate 11 with a certain thickness such as an aluminum alloy sheet that is processed by pressing and stamping so as to form the thin metal casing. The metal substrate 11 consists of an inner surface 12 and an outer surface 13. The inner surface 12 and the outer surface 13 are respectively disposed with plurality of micro concave holes 14 distributed evenly thereon. The micro concave holes 14 are formed naturally during manufacturing processes such as rolling process due to precision of the rolling surface. Moreover, the outer surface 13 of the metal substrate 11 can be processed to be coated with a decorative outer layer 15 such as an electroplated layer, an anodized layer, a painted lay, or a film layer to increase beauty of the outer surface 13.

Then each local part 12a in or on the inner surface 12 of the thin metal casing 10 intended to be arranged with plastic parts is arranged with a thermoplastic rubber (TPR) adhesive layer 20 with a thickness of 400-500 μm. The TPR adhesive layer 20 is a thermoplastic rubber layer synthesized by butadiene-styrene block copolymer and hydrocarbon petroleum resin. The disposition way of the TPR adhesive layer 20 is not limited. The TPR adhesive layer 20 can be arranged by printing, spray coating or an automatic dispensing machine.

Figure 5:
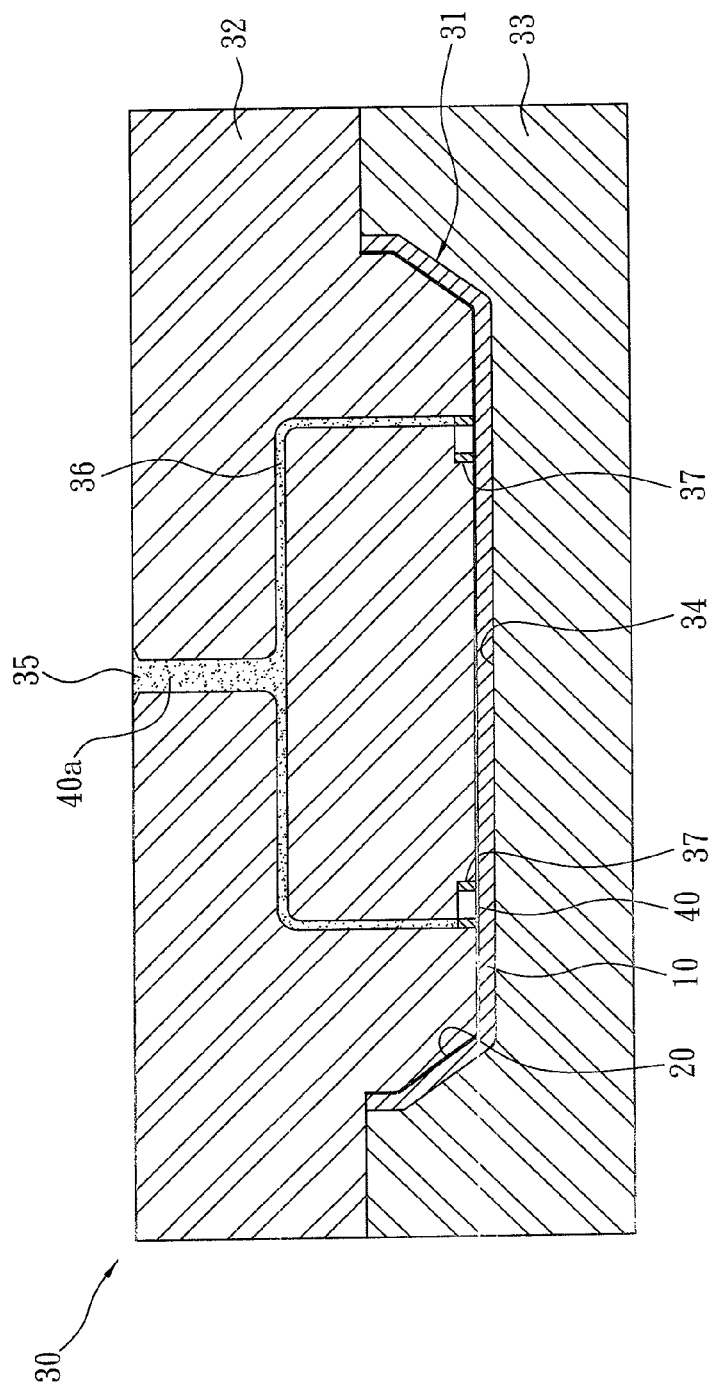
FIG. 5 is a cross section of an injection mold for fixing plastic parts on a surface of a thin metal casing by injection molding according to the present invention.

As shown in FIG. 5, the thin metal casing 10 with the TPR adhesive layer 20 is set and fixed in a cavity 31 of an injection mold 30. The injection mold 30 is designed according to the plastic injection molding techniques available now. The structure of the injection mold 30 such as the number of the cavity, the position of pouring openings, the position of channels for conveying injection materials 36 or the arrangement of positioning devices is not restricted. Take a general injection mold 30 shown in FIG. 5 as an example. The injection mold 30 includes, but not limited to, an upper mold 32 and a lower mold 33. The cavity 31 of the lower mold 33 is disposed with a cavity surface 34 corresponding to the shape of the thin metal casing 10 for receiving and fixing the thin metal casing 10. The upper mold 32 is arranged with pouring openings 35, channels for conveying injection materials 36 and a molding cavity 37 of each plastic part 40 to be connected, etc. There is no restriction on the arrangement of the pouring openings 35 and the channels for conveying injection materials 36. Moreover, the number, positions and shapes of the molding cavities 37 are not limited, able to be modified according to users' needs.

Next the plastic parts 40 are formed on the TPR adhesive layer 20 on the inner surface 12 of the thin metal casing 10 by plastic injection molding. By the pressure and temperature of injection material 40a during injection molding process, the plastic parts 40 are melted and connected to the TPR adhesive layer 20 integrally. At the same time, a part (about 10%) of the TPR adhesive layer 20 with the thickness of 40-50 μm is infiltrated into the existing micro concave holes 14 on the inner surface 12 of the thin metal casing 10. Thus the injected molded plastic parts 40 are fixed on the inner surface 12 of the thin metal casing 10 stably and connected to the thin metal casing 10 to form an integral composite structure, a thin metal casing 1 with plastic parts 40 of the present invention.

Figure 6:
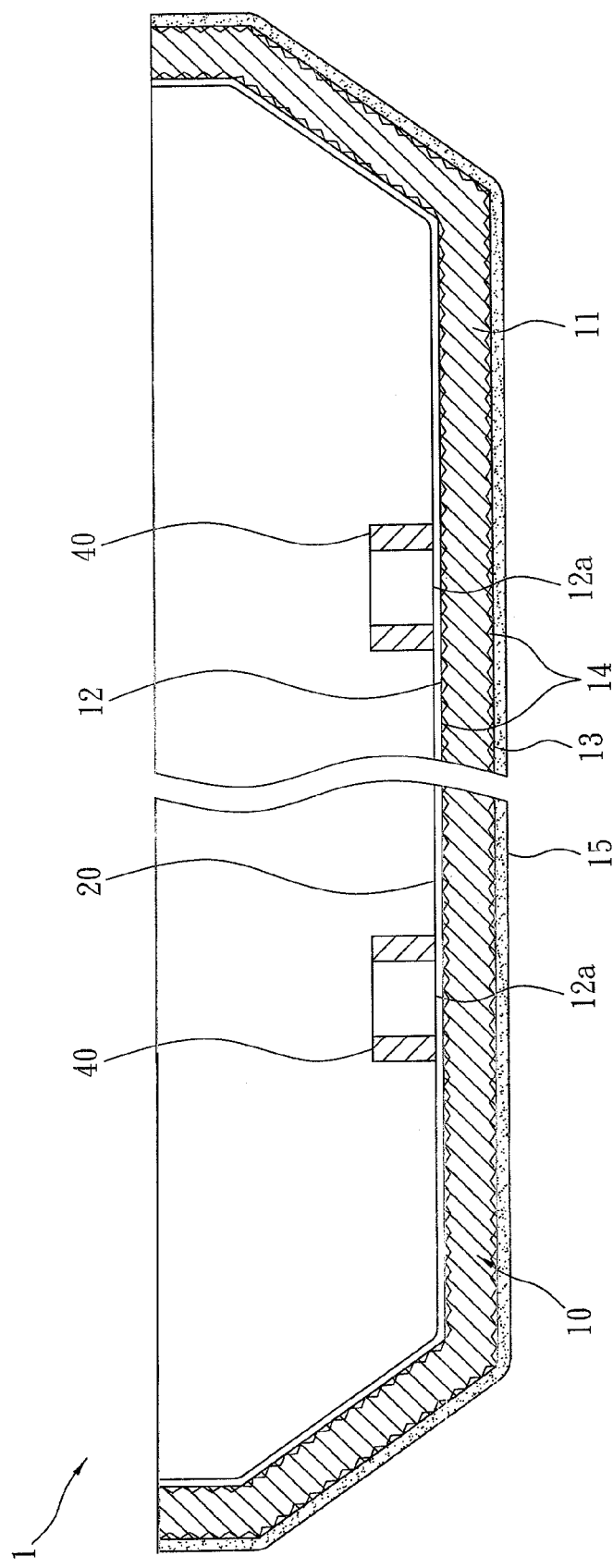
FIG. 6 is a partial enlarged view of a cross section of a thin metal casing with plastic parts according to the present invention.
Figure 7:
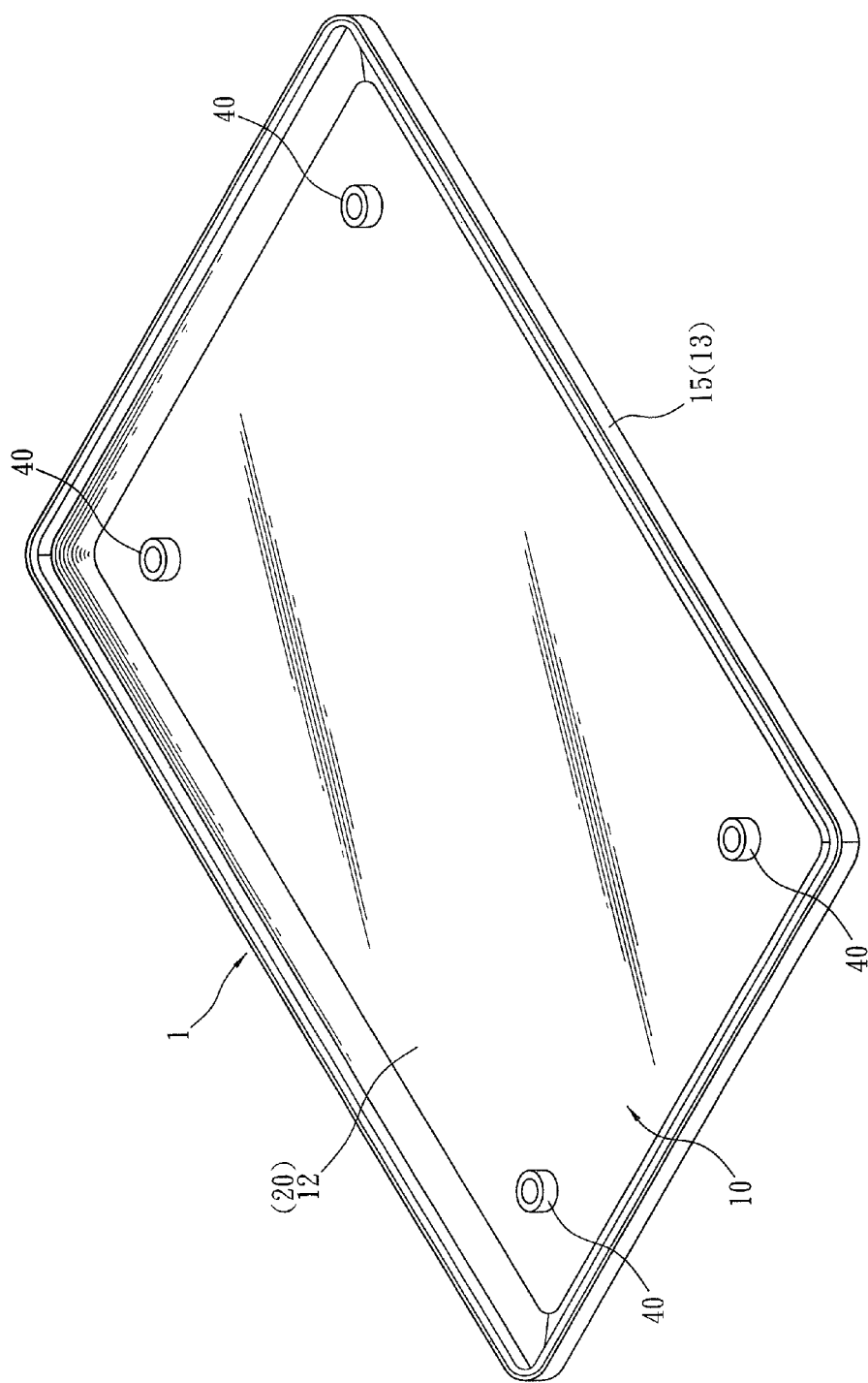
FIG. 7 is a perspective rear view of an embodiment of a thin metal casing with plastic parts according to the present invention.

After cooling, the injection molding mold 30 is removed and the thin metal casing 1 with the plastic parts 40 and having an integral structure is obtained, as shown in FIG. 6 and FIG. 7.

In the above manufacturing method, the TPR adhesive layer 20 is infiltrated into the existing micro concave holes 14 on the metallic inner surface 12 of the thin metal casing 10, melted and connected to the plastic parts 40 firmly to form an integral part. Thus there is a good adhesion and connection between the thin metal casing 10 and the plastic parts 40. After being tested, it is proved that each plastic part 40 on the inner surface 12 has sufficient peel resistance to receive forces various components applied to the corresponding plastic part 40 on following assembling processes. For example, use automatic equipment to fix different components on the plastic part 40 by screws. Thus the plastic parts 40 with good structural strength will not have shortcomings as prior arts. The manufacturing process and the mold can be simplified.

Compared with previous techniques mentioned above, the manufacturing method of present invention matches requirements of environmental protection better. In the present invention, a part of the TPR adhesive layer 20 in the present invention is infiltrated into the micro concave holes 14 that are naturally formed and distributed evenly on the inner surface 12 of the thin metal casing 10 (such as the aluminum alloy substrate 11) during manufacturing processes. Thus the complicated manufacturing processes including preparing specific aqueous solution, using specific processing process such as soaking the metal substrate into the specific aqueous solution, forming and adhering thermoplastic resin with specific ingredients to the surface of the metal substrate and related environmental problems can be avoided.

In the above manufacturing process, before the inner surface 12 of the metal substrate 11 such as aluminum substrate of the thin metal casing 10 being disposed with a TPR adhesive layer 20, a cleaning process is performed according to the surface condition of the inner surface 12. The cleaning process includes but not limited to debinding, forcefully brushing etc. The main purpose of this step is to keep cleanness of a working surface of the inner surface 12 at a certain degree of cleanness for preventing any negative effects on the following processes of disposition of the TPR adhesive layer 20. Thus the good adhesion and tight connection between the TPR adhesive layer 20 and the inner surface 12 are ensured.

In the above manufacturing process, the plastic parts 40 forming on the TPR adhesive layer 20 on the inner surface 12 of the thin metal casing 10 by injection molding is made from injection material 40a including, but not limited to, acrylonitrile butadiene styrene (ABS), polycarbonate resin (PC), acrylic resin, and nylon (polyamide resin). The pressure and temperature during injection molding of these injection materials 40a are as followings. In the case of ABS, the injection pressure is 80 kg/mm$^2$ and the injection temperature is 200° C. For PC, the injection pressure is 120 kg/mm$^2$ and the injection temperature is 260° C. For acrylic resin, the injection pressure is 100 kg/mm$^2$ and the injection temperature is 240° C. In case of nylon, the injection pressure is 80 kg/mm$^2$ and the injection temperature is 260° C.

Refer to FIG. 6 and FIG. 7, the thin metal casing 1 with the plastic parts includes a thin metal casing 10, a TPR adhesive layer 20 and at least one plastic part 40, etc. in sequence.

The thin metal casing 10 of the present invention is, but not limited to a housing of computer products such as notebook computers, communication products or consumer products (3C products) etc. Refer to FIG. 2, FIG. 3 and FIG. 4, take a housing of a notebook computer as an example. The thin metal casing 10 includes but not limited to a metal substrate 11 with a certain thickness such as an aluminum alloy sheet that is processed by pressing and stamping so as to form the thin metal casing. The metal substrate 11 consists of an inner surface 12 and an outer surface 13. The inner surface 12 and the outer surface 13 are respectively disposed with plurality of micro concave holes 14 distributed evenly thereon. The micro concave holes 14 are formed naturally during manufacturing processes such as rolling process due to precision of the rolling surface. For convenience of observation, several micro concave holes 14 are enlarged. There is no need to use specific aqueous solution or specific processing process such as soaking the metal substrate into the specific aqueous solution to form the micro concave holes 14. Moreover, the outer surface 13 of the metal substrate 11 can be processed to be coated with a decorative outer layer 15 such as an electroplated layer, an anodized layer, a painted lay, and a film layer to improve the appearance of the outer surface 13.

The TPR adhesive layer 20 is a thermoplastic rubber film synthesized by butadiene-styrene block copolymer and hydrocarbon petroleum resin. The ingredients are with different ratio such as thermoplastic polyurethane (TPU)/thermoplastic elastomer (TPE). The TPR adhesive layer 20 is with the thickness of about 400-500 μm (1 μm=10$^{-6}$ m). The TPR adhesive layer 20 can be disposed on the whole metallic inner surface 12 of the thin metal casing 10 or only arranged at the local part 12a surface on the inner surface 12 intended to be disposed with the plastic part 40. The disposition way of the TPR adhesive layer 20 is not limited. The TPR adhesive layer 20 can be arranged by printing, spray coating or an automatic dispensing machine.

The number, positions and shape of the plastic part 40 form on the inner surface 12 of the thin metal casing 10 by injection molding are not limited and are able to be modified according to users' needs. The plastic part 40 can be designed into a receiving seat, as shown in FIG. 6 and FIG. 7, or a reinforcing rib. Moreover, the plastic parts 40 are integrated with the TPR adhesive layer 20 by the existing pressure and temperature of the injection material (40a in FIG. 5). That means the plastic parts 40 and the TPR adhesive layer 20 are melted and connected with each other. At the same time, a part (about 10%) of the TPR adhesive layer 20 with the thickness of 40-50 μm is infiltrated into the existing micro concave hole 14 on the metallic inner surface 12 of the thin metal casing 10. Thus the plastic parts 40 are firmly fixed on the metallic inner surface 12 of the thin metal casing 10 to form an integral composite structure. The integral structure enables various components assembled with the plastic part 40 in following assembly operations with strong adhesion therebetween, hard to peel off.

The injection material 40a for the plastic part 40 includes but not limited to one of the followings or their combinations: acrylonitrile butadiene styrene (ABS), polycarbonate resin (PC), acrylic resin, nylon (polyamide resin), etc. The injection pressure and injection temperature of the injection materials 40a are respectively 80 kg/mm$^2$ and 200° C. for ABS, 120 kg/mm$^2$ and 260° C. for PC, 100 kg/mm$^2$ and 240° C. for acrylic resin and 80 kg/mm$^2$ and 260° C. for nylon.

The structure and functions of the thin metal casing with plastic parts of the present invention are further described in details by following embodiments. The metal substrate 11 of each embodiment is aluminum alloy plate but the decorative outer layer 30 is made from different materials.

Embodiment One

In this embodiment, a thin metal casing 1 with plastic parts of the present invention includes a thin metal casing 10 formed by an aluminum substrate 11 with a thickness of 0.8 mm, a decorative outer layer 15 covered on an surface of the thin metal casing 10 and made from artificial fiber such as nylon, polyester, acrylic fiber, etc. with a thickness of 0.3 mm, a TPR adhesive layer 20 that is a thermoplastic rubber layer synthesized by butadiene-styrene block copolymer and hydrocarbon petroleum resin with a thickness of 400-500 μm, and at least one plastic part 40. The plastic part 40 can be, but not limited to a hollow columnar receiving seat, as shown in Fig. to FIG. 7. A sleeve (such as copper) sleeve is melted and mounted into the hollow columnar receiving seat to form a metallic receiving seat for being fastened by a fastener. The plastic part 40 is with a length of 262 mm, width of 178 mm, a thickness of 1 mm and a height of 9.5 mm. After being tested, the peel strength adhesion of this embodiment is 5 kg/cm2. In the environmental testing with adhesion testing, the operating temperature is increasing/decreasing 1° C. each min from −40° C. to 85° C./from 85° C. to −40° C. and there are four cycles. The plastic part 40 is not peeled off from the thin metal casing (aluminum alloy substrate) 10.

Embodiment Two

A thin metal casing 1 with plastic parts of this embodiment consists of a thin metal casing 10 formed by an aluminum substrate 11 with a thickness of 0.8 mm, a decorative outer layer 15 covered on an surface of the thin metal casing 10 and made from PVC artificial fiber/or PU artificial fiber, a TPR adhesive layer 20 that is a thermoplastic rubber layer synthesized by butadiene-styrene block copolymer and hydrocarbon petroleum resin with a thickness of 400-500 μm, and at least one plastic part 40. The plastic part 40 includes, but not limited to a hollow columnar receiving seat. A metal sleeve is melted and mounted into the hollow columnar receiving seat to form a metallic receiving seat. The plastic part 40 is with a length of 262 mm, width of 178 mm, a thickness of 1 mm and a height of 9.5 mm. After being tested, the peel strength adhesion of this embodiment is 5 kg/cm². In the environmental testing with adhesion testing, the operating temperature is increasing/decreasing 1° C. each min from −40° C. to 85° C./from 85° C. to −40° C. and there are four cycles. The plastic part 40 is not peeled off from the thin metal casing (aluminum alloy substrate) 10.

Embodiment Three

The structure of a thin metal casing 1 with plastic parts of this embodiment is similar to that of the second embodiment but is different in that the thin metal casing 10 is formed by pressing and stamping of an aluminum alloy substrate 11 with a thickness of 0.8 mm while a decorative outer layer 15 is formed by sand blasting and surface coloring in anodizing process on surface of the pressed and stamped aluminum alloy substrate 11.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A thin metal casing with at least one plastic part comprising a thin metal casing, a TPR adhesive layer and at least one plastic part; wherein the thin metal casing is formed by a metal substrate with a certain thickness being processed while a plurality of micro concave holes is naturally formed on an inner surface and an outer surface of the metal substrate during manufacturing of the metal substrate and is distributed evenly thereon;
   the TPR adhesive layer is a thermoplastic rubber layer synthesized by butadiene-styrene block copolymer and hydrocarbon petroleum resin, having a thickness of 400-500 μm and arranged at the metallic inner surface of the thin metal casing;
   the plastic part is formed by plastic injection molding that sets and fixes the thin metal casing with the TPR adhesive layer into a cavity of an injection mold for injecting at least one injection material to the inner surface of the thin metal casing;
   wherein the plastic part and the TPR adhesive layer are melted and integrated with each other by injection pressure and temperature of the injection material during injection molding while a part of the thickness of the TPR adhesive layer is simultaneously infiltrated into the micro concave holes on the metallic inner surface of the thin metal casing so that the injected plastic part and the thin metal casing are connected to form an integral composite structure.

2. The device as claimed in claim 1, wherein the metal substrate is an aluminum alloy plate.

3. The device as claimed in claim 1, wherein the TPR adhesive layer is disposed on the whole metallic inner surface of the thin metal casing or only a part of the inner surface of the thin metal casing to be arranged with the plastic part.

4. The device as claimed in claim 1, wherein the TPR adhesive layer is arranged by printing or spray coating.

5. The device as claimed in claim 1, wherein the part of the thickness of the TPR adhesive layer simultaneously infiltrated into the micro concave holes on the metallic inner surface of the thin metal casing during the plastic injection molding is 10% of the thickness of 400-500 μm, 40-50 μm.

6. The device as claimed in claim 1, wherein the injection material of the plastic part is selected from the group consisting of the following: acrylonitrile butadiene styrene (ABS), polycarbonate resin (PC), acrylic resin, and polyamide resin (nylon), or their combinations.

7. The device as claimed in claim 1, wherein the outer surface of the metal substrate is disposed with a decorative outer layer formed by processing.

8. The device as claimed in claim 7, wherein the decorative outer layer selected from the group consisting of the following: an electroplated layer, an anodized layer, a painted lay, and a film layer.

9. A manufacturing method of a thin metal casing with at least one plastic part used for manufacturing of the thin metal casing connected with at least one plastic part claimed from claim 1 comprising the steps of:
   providing a thin metal casing formed by a metal substrate with a certain thickness being processed and an inner surface and an outer surface of the metal substrate having a plurality of evenly-distributed micro concave holes thereof;
   arranging a TPR adhesive layer with a thickness of 400-500 μm on the metallic inner surface of the thin metal casing while the TPR adhesive layer is a thermoplastic rubber layer synthesized by butadiene-styrene block copolymer and hydrocarbon petroleum resin;
   fixing the thin metal casing with the TPR adhesive layer in a cavity of an injection mold and injecting at least one injection material at the TPR adhesive layer on the inner surface of the thin metal casing to form at least one plastic part by plastic injection molding; the plastic part and the TPR adhesive layer are connected and integrated by pressure and temperature of the injection material during injection molding and a part of the TPR adhesive layer is infiltrated into the micro concave holes on the inner surface of the thin metal casing so that the plastic part and the thin metal casing are connected to form an integral composite structure; and
   removing the injection mold after cooling to get a thin metal casing with at least one plastic part.

* * * * *